United States Patent [19]

Yoshimura et al.

[11] 4,332,268

[45] Jun. 1, 1982

[54] ATMOSPHERIC PRESSURE COMPENSATION DEVICE

[75] Inventors: Junjiro Yoshimura, Okazaki; Akira Furukawa, Anjo; Takehiro Ando, Kariya, all of Japan

[73] Assignee: Nippondenso Co., Ltd., Kariya, Japan

[21] Appl. No.: 72,296

[22] Filed: Sep. 4, 1979

[30] Foreign Application Priority Data

Jan. 16, 1979 [JP] Japan ........................ 54/4416[U]
Mar. 8, 1979 [JP] Japan ........................ 54/29805[U]

[51] Int. Cl.$^{3}$ ........................ F16K 17/36
[52] U.S. Cl. ........................ 137/81.1; 123/437; 261/39 A; 261/121 B
[58] Field of Search ........................ 123/410, 412, 437, 465; 137/81.1; 261/39 A, 121 B; 251/228, 298

[56] References Cited

U.S. PATENT DOCUMENTS

| | | | |
|---|---|---|---|
| 2,608,200 | 8/1952 | Stockman | 137/81.1 |
| 2,963,034 | 12/1960 | Cummins | 137/81.1 |
| 3,102,712 | 9/1963 | Zilk | 251/298 |
| 3,526,241 | 9/1970 | Veit | 137/81.1 |
| 3,589,380 | 6/1971 | Gastinne | 137/81.1 |
| 3,667,740 | 6/1972 | Mortstedt | 261/39 A |
| 3,817,277 | 6/1974 | Wheatley | 251/298 |
| 3,859,397 | 1/1975 | Tryon | 261/121 B |
| 3,875,957 | 4/1975 | Veit et al. | 137/81.1 |
| 3,987,131 | 10/1976 | Hisatomi et al. | 261/121 B |
| 4,177,224 | 12/1979 | Yamanaka et al. | 261/121 B |

FOREIGN PATENT DOCUMENTS

| | | | |
|---|---|---|---|
| 863828 | 3/1961 | United Kingdom | 137/81.1 |

*Primary Examiner*—George L. Walton
*Attorney, Agent, or Firm*—Cushman, Darby & Cushman

[57] ABSTRACT

An atmospheric pressure compensation device has a reed valve of a resiliently bendable sheet material extending over a flat valve seat which defines therein an opening leading to an air passage to be connected to an air bleed of a carburetor, for example. The angular position of the freely bendable end portion of the reed valve relative to the valve seat is varied by a bellows member which is expansible and contractible in response to variation in the atmospheric pressure, to thereby control the rate of air flow through the opening and the passage to the air bleed. A fulcrum member is disposed in engagement with the reed valve to urge the same against the valve seat. The point of engagement of the fulcrum member with the reed valve is variable along the length thereof to vary the freely bendable length of the reed valve.

1 Claim, 16 Drawing Figures

ATMOSPHERIC PRESSURE COMPENSATION DEVICE

BACKGROUND OF THE INVENTION

1. Field of the Invention

The present invention relates to an atmospheric pressure compensation device operable in response to variation in the atmospheric pressure level. The device is useful, for example, to control the air-fuel ratio of a mixture produced by a carburetor of an internal combustion engine or the ignition timing of the engine in accordance with the atmospheric pressure level at which the engine is operated. The invention will be described hereunder in connection with an internal combustion engine, but it is to be understood that the application of the present invention is not limited to this class of art.

2. Description of the Prior Art

In general, the carburetor of an internal combustion engine has a primary main nozzle, a secondary main nozzle, a slow circuit and a power nozzle. The rates of the fuel flow through these nozzles and circuit are controlled dependent on the venturi vacuum, the intake manifold vacuum and the rates of air supplies through respective air bleeds to thereby adjust the air-fuel ratio of an air-fuel mixture produced by the carburetor. The atmospheric pressure is at a low level at a high altitude. Thus, the air supplied through the air bleeds into the carburetor is of a density smaller or lower than that available at a low altitude or on the so-called "lowland." The supply of the low-density air causes an enrichment of the air-fuel mixture with a resultant increase in the emission of the harmful components of the engine exhaust gases.

In an attempt to eliminate this problem, there has been deviced a carburetor in which the air flows through air bleeds are controlled by needle valves which are actuated by a pressure responsive bellows member of members. However, because the carburetor air bleeds are of diameters ranging from 0.5 to 1.0 mm, the needles to be associated with such very small holes or openings must be machined extremely precisely. In addition, the needle valves must be moved over relatively long strokes. In the case where a single bellows member is used to actuate a plurality of needles associated with respective air bleeds of the carburetor, a very complicated mechanism, such as a link work, is needed to operatively connect the bellows member to the needles. The link work must be precisely made so as to accurately transmit deformation of the bellows member to respective needles.

SUMMARY OF THE INVENTION

It is an object of the present invention to provide an improved atmospheric pressure compensation device which is free from the problems of the prior art discussed above.

The atmospheric pressure compensation device according to the present invention comprises means providing a surface in which at least one opening is formed, the opening leading to a passage for a fluid, such as air to be fed into a carburetor, for example. The portion of the surface around the opening provides a substantially flat valve seat. A valve member of a one-piece structure is associated with the valve seat and has a substantially flat valve surface adapted to be brought into engagement with the valve seat. The position of the valve member relative to the valve seat is varied by bellows means which is responsive to variation in the atmospheric pressure.

Preferably, the valve member may be formed of a resiliently bendable sheet material and may be fixed at one end to the surface in which the opening is formed, so that the free end portion of the valve member extends over the valve seat. The bellows means may preferably be operatively associated with the free end of the valve member so that, when the bellows means is expanded or contracted due to a variation in the atmospheric pressure level, the free end portion of the valve member is bent or angularly moved relative to the valve seat to vary the degree of the opening of the valve.

To use the flat valve seat and the flat valve surface is advantageous in that the movement of the valve member within a very limited angular range is sufficient to cover a wide range of the atmospheric pressure variation. In addition, the flat valve surface may be of a size which is large enough to cover a plurality of openings or ports.

The device of the invention may preferably be provided with means for adjusting the length of the free end portion of the valve member.

The above and other objects, features and advantages of the present invention will be made more apparent by the following description with reference to the accompanying drawings.

DESCRIPTION OF PREFERRED EMBODIMENTS

Figure 1:
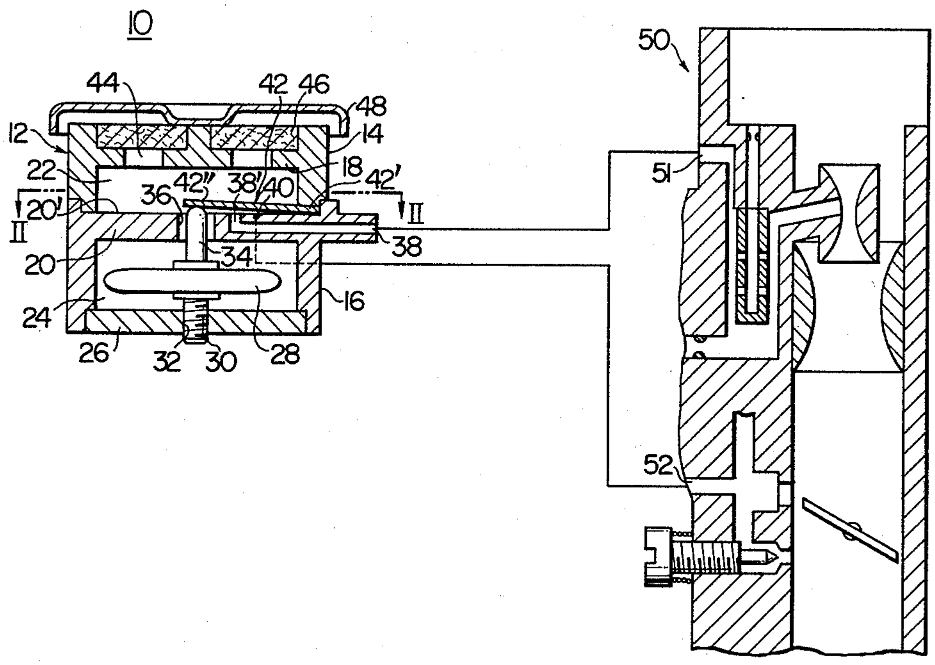
FIG. 1 is a partly sectional view of a first embodiment of an atmospheric pressure compensation device according to the present invention associated with a carburetor of an internal combustion engine.
Figure 2:
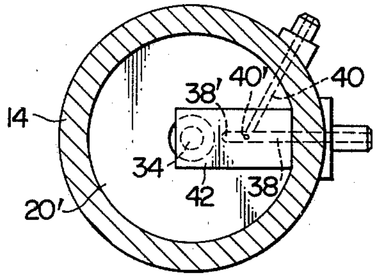
FIG. 2 is across-section taken along line II—II in FIG. 1.

Referring first to FIGS. 1 and 2, a first embodiment of the atmospheric pressure compensation device according to the present invention is generally designated by reference numeral 10 and includes a generally cylindrical housing 12 comprising upper and lower housing parts 14 and 16 secured together by fastening means such as screws (not shown). The housing parts 14 and 16 have transverse walls 18 and 20, respectively, adjacent to their one ends. The transverse walls 18 and 20 cooperate to define therebetween a first chamber 22. A second chamber 24 is defined in the lower housing part 16 between the transverse wall 20 and a closure plate 26 attached to the other end of the housing part 16.

A bellows member 28 of a resilient metal, such as phosphor bronze or beryllium bronze, is disposed in the second chamber 24. The interior of the bellows member 28 is at a vacuum level. The bellows member 28 is adjustably supported in the chamber 24 by means of a screw or bolt 30 secured to one end wall of the bellows member 28 and extending in threadable engagement with a threaded hole 32 formed in the closure member 26. A rod 34 is secured to the other end wall of the bellows member 28 and extending loosely through a central opening 36 formed in the transverse wall 20 of the lower housing part 16. The bellows member 28 is axially expansible and contractible in response to variation in the level of the atmospheric pressure so that the end extremity of the rod 34 projects into the first chamber 22 or is retracted therefrom into the opening 36 in the wall 20 in accordance with the atmospheric pressure level.

Passages 38 and 40 are formed in and generally radially extend through the transverse wall 20 of the lower housing part 16 and are respectively open as at 38' and 40' in the surface 20' of the wall 20 facing the first chamber 20. The passage 38 is pneumatically connected to a main air bleed port 51 of a carburetor 50, while the passage 40 is connected to a slow air bleed port 52 of the carburetor.

A valve member 42 of a resilient sheet material, such as a sheet metal, is secured at one end 42' to the housing 12 by being disposed between the upper and lower housing parts 14 and 16 and extends radially inwardly into the first chamber 22 along the surface 20' of the transverse wall 20 and over the openings 38' and 40'. The other end 42" of the valve member 42 is so positioned as to be engaged and upwardly lifted by the rod 34 of the bellows member 28, as shown in FIG. 1, when the atmospheric pressure is lowered to allow the bellows member to be axially expanded. When the atmospheric pressure is increased to axially contract the bellows member 28, the resiliency of the valve member 42 returns the valve member to its initial or normal position in which the valve member is in sealing engagment with the surface 20' of the wall 20 to close the openings 38' and 40'. The surface 20', therefore, acts as a valve seat.

The chamber 22 is provided with air inlet openings 44 formed in the transverse wall 18. The openings 44 are covered with an air filter element 46 held in position by a filter retainer 48 mounted on the transverse wall 18.

In operation, when the car with an engine which is equipped with the described atmospheric pressure compensation device 10 is placed at a low level or altitude, the atmospheric pressure is at a level high enough to axially contract the bellows member 28 so that the rod 34 is retracted from the chamber 22 into the opening 36. Thus, the valve member 42 is in its initial position in which the valve member is in sealing engagement with the valve seat 20' to block or close the openings 38' and 40', with a result that no air is fed to the air bleed ports 51 and 52 of the carburetor 50.

As the car climbs up a hill to a high altitude, the atmospheric pressure is lowered with a resultant axial expansion of the bellows member 28. Thus, the rod 34 is brought into engagement with the end 42" of the valve member 42. Because the valve member 42 is secured to the housing 12 at the end 42' of the valve member, the engagement of the rod 34 with the end 42" of the valve member 42 deforms or bends the valve member out of sealing engagement with the valve seat 20' into an inclined position, as shown in FIG. 1, so that the openings 38' and 40' in the valve surface 20' are brought into communication with the chamber 22. The end 42" of the valve member 42 is lifted by the rod 34 in proportion to the axial expansion of the bellows member 28 and, hence, to the decrease in the atmospheric pressure level. Accordingly, the degrees of opening of the valve openings 38' and 40' are increased in analog fashion by the decrease in the atomospheric pressure level. The atmospheric air flowing through the air filter element 46 and the air inlet openings 44 into the chamber 22 flows therefrom through the valve openings 38' and 40' into the passages 38 and 40 and thus to the main and slow air bleed ports 51 and 52 of the carburetor 50 to adjust the air-fuel ratio of the air-fuel mixture produced in the carburetor 50. Namely, the air supplies through the air bleed ports are increased as the atmospheric pressure is decreased thereby to continuously compensate the air-fuel ratio of the mixture produced by the carburetor.

Preferably, the valve openings 38' and 40' are positioned relative to the fixed end 42' of the valve member 42 such that the larger opening is more remote from the valve end 42' than the smaller opening to ensure that the degrees of opening of the valve openings 38' and 40' are increased substantially at the same rate as the bellows member 28 is axially expanded.

Figure 3:
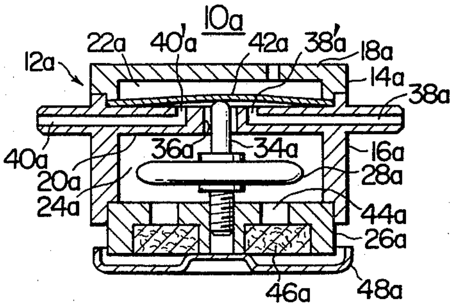
FIG. 3 is a sectional view of a first modification of the embodiment shown in FIG. 1.

A modification of the embodiment 10 of the device of the invention is shown at 10*a* in FIG. 3 wherein parts similar to those in FIGS. 1 and 2 are designated by similar reference numerals followed by "a." The modification 10*a* is differentiated from the embodiment 10 mainly in that a closure member 26*a* attached to a lower housing part 16*a* is formed therein with air inlet openings 44*a* which are covered with an air filter element 46*a* held in position by a filter element retainer 48*a* mounted to the closure member 26*a*. The atmospheric air flows through the filter element 46*a* and the air inlet openings 44*a* into a chamber 24*a* defined in the lower housing part 16*a*. A valve member 42*a* for valve openings 38'*a* and 40'*a* is formed of a disc of a resilient seat material having a peripheral edge portion secured to the inner peripheral surface of a housing 12*a*, i.e., pinched between upper and lower housing parts 14*a* and 16*a*. A bellows member 28*a* is disposed in the chamber 24*a*, as in the first embodiment 10, and when this bellows member 28*a* is axially expanded by the decrease in the atmospheric pressure level, the central part of the disc-like valve member 42*a* is lifted to communicate the valve openings 38'*a* and 40'*a* with the chamber 24*a* through an opening 36*a* formed in a transverse wall 20*a* of the lower housing part 16*a*, so that the air flows from the chamber 24*a* through the opening 36*a* and the valve openings 38'*a* and 40'*a* into passages 38*a* and 40*a*, respectively.

Figure 4:
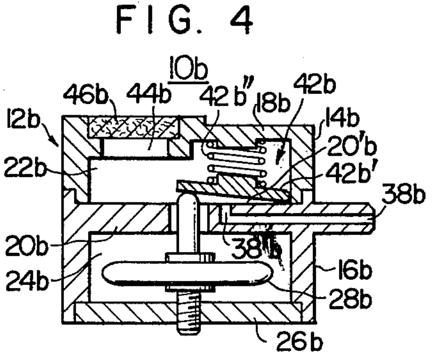
FIG. 4 is a view similar to FIG. 3 but illustrates a second modification of the embodiment shown in FIG. 1.

A second modification 10*b* is shown in FIG. 4 wherein the parts similar to those in FIGS. 1 and 2 are designated by similar reference numerals followed by "b." The modification 10*b* is different from the embodiment 10 mainly in that a valve member 42*b* for opening and closing a valve opening 38'*b* is in the form of a plate-like member 42'*b* of a rigid material, such as stainless steel, resiliently biased by a compression spring 42*b*" toward a transverse wall 20*b* in which a passage 38*b* is formed and open as at 38'*b* in a valve seat 20'*b*. When a bellows member 28*b* is axially expanded, one end of the rigid valve member 42*b*' is lifted, as shown in FIG. 4, to allow the atmospheric air to flow from a chamber 22*b* through the valve opening 38'*b* into the passage 38*b*.

Figure 5:
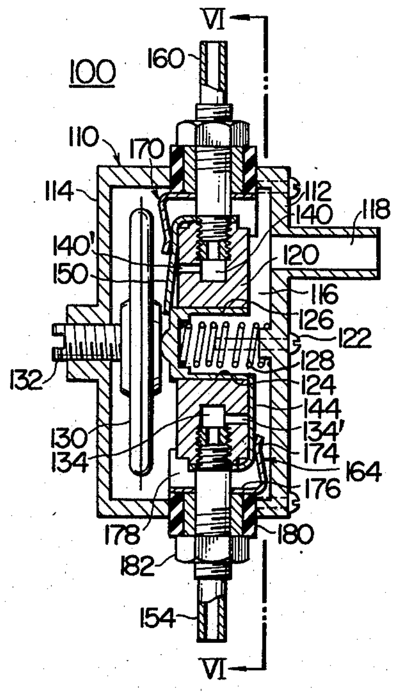
FIG. 5 is a sectional view of a second embodiment of the present invention as taken along line V—V in FIG. 6.
Figure 6:
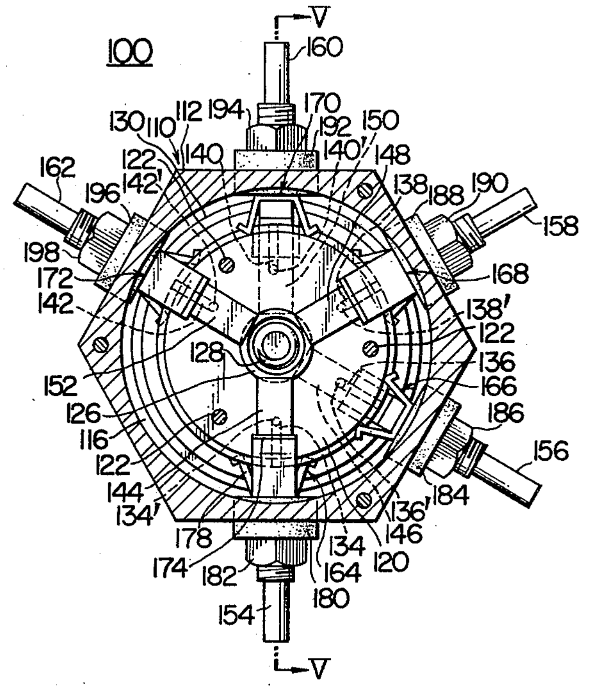
FIG. 6 is a cross-section taken along line VI—VI in FIG. 5.

A second embodiment 100 of the atmospheric pressure compensation device according to the present invention is shown in FIGS. 5 and 6. The embodiment 100 includes a housing 110 comprising a housing member 112 and a cover member 114 which are secured together by screws and cooperate together to define an atmospheric pressure chamber 116 communicated with the atmosphere through an air inlet port 118 formed in the housing member 112. A center plate 120 is disposed in the chamber 116 and supported from the housing member 112 by means of a plurality of screws 122. The plate 120 is spaced from the housing member 112 and the cover member 114 and is provided with an axial through-hole or bore 124 in which a cup-shaped member 126 is axially slidably received and resiliently biased leftwards as viewed in FIG. 5 by a compression coil spring 128 extending between the bottom of the recess in the cup-shaped member 126 and the inner surface of the housing member 112. A bellows member 130, which is similar in structure to the bellows member 28 of the preceding embodiment, is disposed in the atmospheric pressure chamber 116 so that one end of the bellows member 130 is in engagement with the closed or inner end of the cup-shaped member 126. The other end of the bellows member 130 is rigidly connected to a screw or bolt 132 which is in thereadable engagement with the cover member 114 so that the position of the bellows member relative to the center plate 120 can be adjusted.

The center plate 120 is formed therein with first to fifth passages 134, 136, 138, 140 and 142 extending radially inwardly from the outer peripheral surface of the plate 120. The first, third and fifth radial passages 134, 138 and 142 have their inner ends open as at 134', 138' and 142' in the end surface of the center plate 120 adjacent to the air inlet port 118, while the second and fourth radial passages 136 and 140 have their inner ends open as at 136' and 140' in the end surface of the center plate 120 facing the bellows member 130. First to fifth reed valves 144, 146, 148, 150 and 152 of a spring material are provided to control the communications of the first to fifth openings 134'-142' with the atmospheric pressure chamber 116. As will be seen in FIGS. 5 and 6, the first fo fifth reed valves 144 to 152 extend radially inwardly from the outer peripheral edge of the center plate 120 to cover the respective openings 134' to 142' and have inner ends projecting slightly inwardly beyond the peripheral edges of the opposite ends of the central bore 124 in the center plate 120 so that, when the cup-shaped member 126 is axially moved relative to the center plate 120, either the group of first, third and fifth reed valves 144, 148 and 152 or the group of the second and fourth reed valves 146 and 150 are engaged by the cup-shaped member 126 and bent away from the mating end surface of the center plate 120.

The first to fifth radial passages 134–142 are respectively pneumatically connected to pipes 154–162 which extend through the peripheral wall of the housing 110 and are screwed into the radial passages 134–142, respectively. The reed valves 144–152 have their radially outer ends fixed to the outer periphery of the center plate 120 by the radially inner ends of the pipes 154–162 screwed into the radial passages, respectively. The reed valves 144–152 are provided with means for adjusting the free or flexible lengths of the reed valves. In the illustrated embodiment of the invention, these adjusting means are in the form of support or fulcrum members 164, 166, 168, 170 and 172. The fulcrum members are similar in structure and it will be sufficient to describe the structure and arrangement of only one of them 164. The fulcrum member 164 includes a radially inner end portion 174 in pressure engagement with the associated reed valve 144, as best seen in FIG. 5, a pair of legs 178 in engagement with the outer peripheral surface of the center plate 120, as shown in FIG. 6, and an axially extending radially outer end portion 176 having an opening through which the associated pipe 154 extends. A collar assembly 180 consisting of an inner coller of a metal and an outer coller of an elastomeric material is inserted into a radial opening in the housing 110 through which the pipe 154 extends. The collar assembly 180 is mounted on the pipe 154 for axial movement thereon and has an inner end face in abutment contact with the radially outer portion 176 of the fulcrum member 164. The outer end face of the collar assembly 180 is engaged by a nut 182 which is in thereadable engagement with external threads formed on the outer surface of the pipe 154. It will be appreciated that the rotation of the nut 182 in one direction radially inwardly moves the collar assembly 180 with a result that the fulcrum member 164 is radially inwardly moved relative to the associated reed valve 144, whereby the point of engagement of the inner portion 174 of the fulcrum member 164 with the reed valve 144 is radially inwardly displaced to shorten the free or flexible length of the reed valve with a resultant increase in the stiffness of the valve. The rotation of the nut 182 in the other direction allows the fulcrum member 164 to be radially outwardly moved realtive to the reed valve 144 by the spring force imparted by the legs 178 of the fulcrum member to the outer periphery of the center plate 120, with a result that the free length of the reed valve 144 is increased. The fulcrum member 164 is stiffer than the reed valve 144.

It is to be noted that the other four fulcrum members 166–172 are similar in structure to the described fulcrum member 164 and can be radially moved relative to respective reed valves 146–152 by means of respective sets of collar assemblies and nuts 184 and 186; 188 and 190; 192 and 194 and 196 and 198.

With the structure and arrangement described above, when the atmospheric pressure is at a high level, the bellows member 130 is axially contracted to allow the cup-shaped member 126 to be axially moved leftwards, as viewed in FIG. 5, so that the second and fourth reed valves 146 and 150 are bent by the member 126 away from the center plate 120 to communicate the openings 136′ and 140′ of the radial passages 136 and 140 with the atmospheric pressure chamber 116 whereas the first, third and fifth reed valves 144, 148 and 152 are held in sealing engagement with the associated end face of the center plate 120 so that the openings 134′, 138′ and 142′ of the radial passages 134, 138 and 142 are out of communication with the atmospheric pressure chamber 116. When the atmospheric pressure level is lowered, the bellows member 130 is axially expanded to axially move the cup-shaped member 124 rightwards, as viewed in FIG. 5, against the compression spring 128, so that the reed valves 146 and 150 are returned to their initial positions in sealing engagement with the center plate 120 whereas the reed valves 144, 148 and 152 are moved out of engagement with the center plate 120. The degree of opening of each of the reed valves is gradually varied as the cup-shaped member 126 is axially moved relative to the center plate 120.

Figure 7:
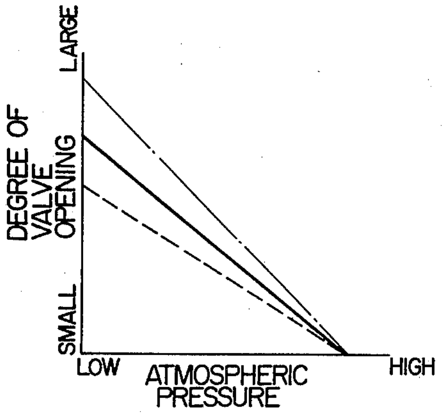
FIG. 7 is a graphical illustration of the operational characteristic of each of reed valves of the second embodiment as adjusted by means for adjusting free length of the reed valve.

FIG. 7 graphically illustrates the operational characteristic of one of the reed valves 144 as adjusted by means of the fulcrum member 164. As will be seen in FIG. 7, the degree of the opening of the reed valve 144 is increased as the atmospheric pressure is lowered, as shown by the solid line in FIG. 7. Rotation of the nut 182 in a direction to move the fulcrum member 164 radially inwardly relative to the reed valve 144 shortens the free length of the reed valve, with a result that the variation in the opening of the valve 144 as caused by the change of the atmospheric pressure level is made small or moderate, as shown by the broken line in FIG. 7. On the other hand, the rotation of the nut 182 in the other direction allows the fulcrum member 164 to be radially outwardly moved by the spring force imparted by the legs 178 so that the free length of the reed valve 144 is increased with a resultant sharp variation in the degree of the valve opening caused by the change of the atmospheric pressure level, as shown by the dot and dash line in FIG. 7.

It will be appreciated that similar operational characteristics are provided by the other reed valves 146, 148, 150 and 152 and the associated fulcrum members 166–172.

Figure 8:
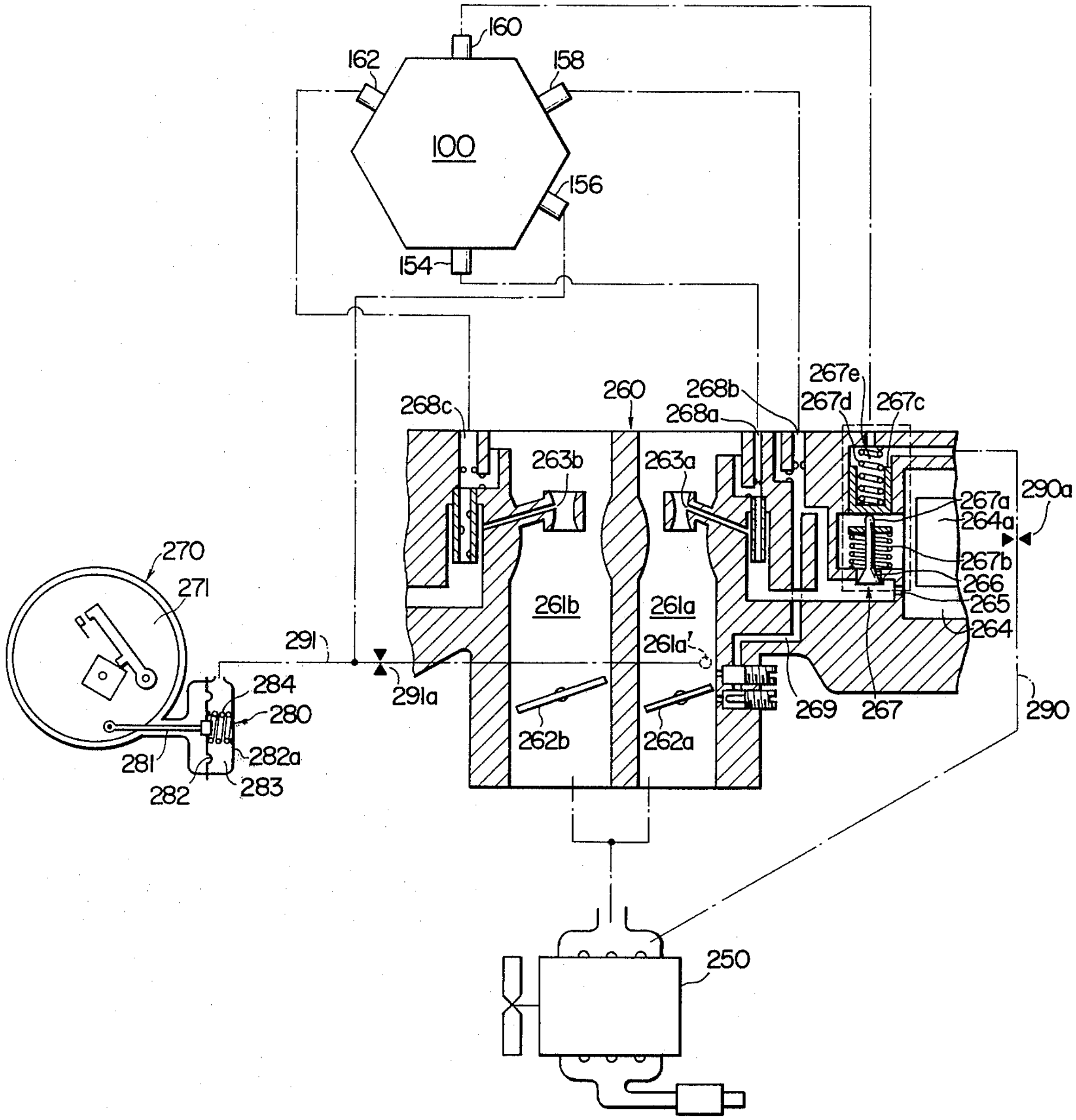
FIG. 8 illustrates, in partly diagrammatic and partly sectional view, an example of the use of the second embodiment of the invention wherein the second embodiment is associated with a carburetor and a vacuum advancer of an internal combustion engine.

An example of the use of the atmospheric pressure compensation device 100 will be described with reference to FIG. 8. An internal combustion engine 250 is equipped with an intake system which includes a carburetor 260 which has primary and secondary bores **261*a* and 261*b* in which are provided throttle valves 262*a* and 262*b* as well as a primary main nozzle 263*a* and a secondary main nozzle 263*b*. A float chamber 264 accommodates a float 264*a*. The fuel flows from the float chamber 264 normally through a main jet 265. During an acceleration operation, the fuel flows from the float chamber 264 also through a power jet 266 which is opened and closed by a power valve means 267 which includes a valve member 267*a* operative to open and close the power jet 266; a first spring member 267*b* biasing the valve member 267*a* in valve-closing direction; a piston 267*c* responsive to the intake manifold vacuum of the engine to actuate the valve member 267*a*; a second spring member 267*d* providing a spring force greater than that of the first spring member 267*b* and biasing the piston 267*c* against the first spring; and a vacuum chamber 267*e* to which the upper surface of the piston 267*c* is exposed and which is pneumatically connected to the intake manifold of the engine 250 through a vacuum line 290 in which a fixed restriction 290*a*** is provided.

The carburetor 260 is also provided with auxiliary air bleeds **268*a*, 268*b* and 268*c* and a slow circuit 269. A vacuum port 261*a*′ is formed in the peripheral wall of the primary bore 261*a* upstream of the throttle valve 262*a* and is pneumatically connected to a vacuum advancer 280 through a second vacuum line 291 in which a fixed restriction 291*a* is provided. The vacuum advancer 280 is provided for a distributor 270 and includes a rod 281 having one end operatively connected to a rotary disc 271 of the distributor 270. The other end of the rod 281 is connected to a diaphragm 282 disposed in a housing 282*a* and cooperates therewith to define a vacuum chamber 283 in which a compression spring 284 is disposed and which is pneumatically connected to the vacuum port 261*a*′ through the second vacuum line 291**.

The first to fifth pipes 154–162 of the atmospheric pressure compensation device 100 are pneumatically connected to the first auxiliary air bleed **268*a*, to the second vacuum line 291, to the second auxiliary air bleed 268*b*, to the vacuum chamber 267*e* of the power valve means 267, and to the third auxiliary air bleed 268*c***, respectively.

With the structure described above, when a car equipped with the system described above is running on a lowland, the atmospheric pressure is at a normal or "high" level and the bellows member 130 is axially contracted. Thus, the openings 134′, 138′ and 142′ which are connected through the pipes 154, 158 and 162 to the auxiliary air bleeds **268*a*, 268*b* and 268*c*, respectively, are all closed by the reed valves 144, 148 and 152, respectively, whereas the other openings 136′ and 140′ which are connected through the pipes 156 and 160 to the vacuum line 291 and the vacuum chamber 267*e* of the power valve means 267 are opened to the atmospheric pressure chamber 116 in the housing 110. Thus, the vacuum levels in the vacuum chamber 267*e* of the power valve 267 and in the vacuum chamber 283 of the vacuum advancer 280 are decreased. The first and second spring members 267*b* and 267*d* of the power valve 267 are designed to provide spring forces which are respectively about one half the spring forces provided by similar spring members used in the conventional carburetor. Similarly, the spring member 284 of the vacuum advancer 280 is designed to provide a spring force which is about one half the spring force provided by a similar spring member disposed in the conventional vacuum advancer. The power valve 267 employing the described spring members 267*b* and 267*d* and the vacuum advancer 280 employing the described spring member 284** are operable in manners similar to those of the conventional power valve and vacuum advancer.

When the car is operated on a highland, the atmospheric pressure (i.e., the absolute pressure) is lower than on the lowland, so that the bellows member 130 is axially expanded to adjust the degrees of the openings of the reed valves 144–152 in accordance with the level of the atmospheric pressure (and thus the altitude). Thus, the respective auxiliary air bleeds **268*a*, 268*b* and 268*c* of the carburetor 260 are supplied with air at rates which are determined by the atmospheric pressure level. In the past, a carburetor when operated at a high altitude tended to produce an air-fuel mixture at a small air-fuel ratio (namely, a rich air-fuel mixture) due to a low density of air (as used by the decrease in the atmospheric pressure level at the high altitude). With the system described above, however, the air introduced into the carburetor 260 through the auxiliary air bleeds 268***a*, 268*b* and 268*c* advantageously adjusts the rates of fuel discharge through the main nozzles 263*a* and 263*b*, the slow circuit 269 and the power jet 266 so that the air-fuel mixture produced by the carburetor 260 is at an adjusted air-fuel ratio which is substantially equal to the air-fuel ratio obtained on the lowland. The discussed advantageous operation can be obtained at any altitude because the degrees of the openings of the reed valves 144 to 152 are continously controlled in accordance with the atmospheric pressure level.

In addition, when a conventional internal combustion engine is operated on a highland, the supply of air-fuel mixture to the engine is smaller in amount than on the lowland because of the lowered atmospheric pressure level (and thus decreased density of air), with a result that the engine output is decreased or lowered. With the engine 250 equipped with the system shown in FIG. 8, however, the valve opening 136′ of the device 100 which opening is pneumatically connected to the vacuum chamber 283 of the vacuum advancer 280 is gradually closed by the associated reed valve 146 as the atmospheric pressure level is lowered (the altitude is increased). Thus, the vacuum level in the vacuum chamber 283 of the advancer 280 is increased accordingly to shift the rod 281 rightward, as viewed in FIG. 8, for thereby advancing the ignition timing, with a result that the engine output drop which would otherwise be caused by the atmospheric pressure drop can advantageously be eliminated because the advancement of the ignition timing results in the increase in the engine output.

Figure 9:
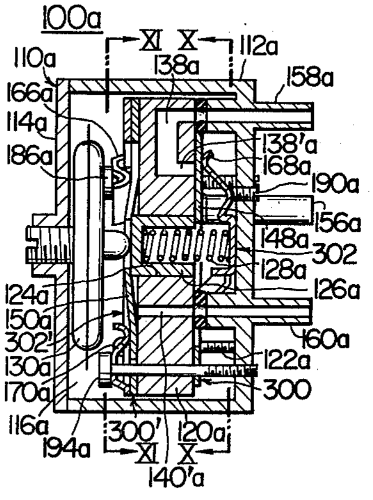
FIG. 9 is a view similar to FIG. 5 but illustrates a modification of the second embodiment of the invention.
Figure 10:
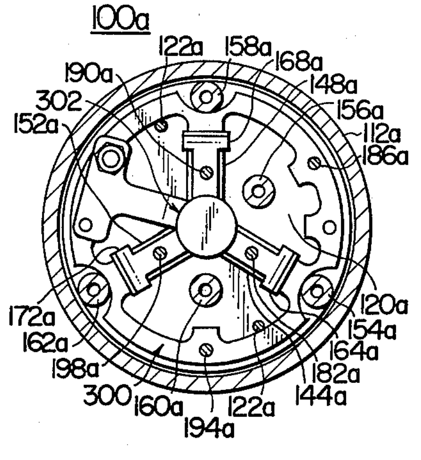
FIGS. 10 and 11 are cross-sections taken along lines X—X and XI—XI in FIG. 9, respectively.
Figure 11:
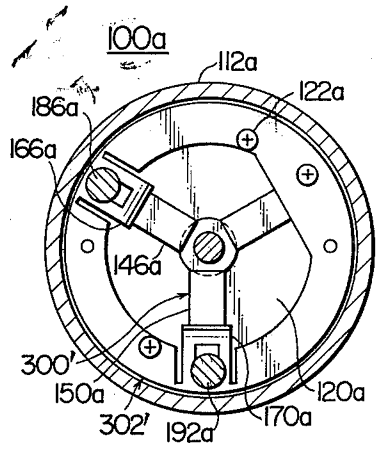
Figure 12A:
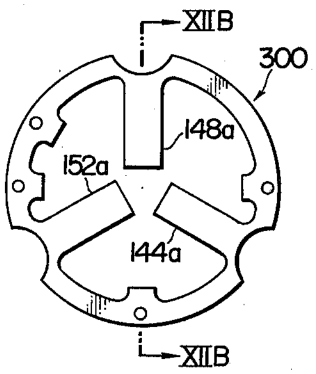
FIG. 12A is a plan view of an integral reed valve structure shown in FIGS. 9 and 10.
Figure 12B:
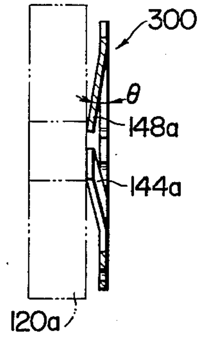
FIG. 12B is a cross-section taken along line XIIB—XIIB in FIG. 12A.

A modification 100*a* of the embodiment 100 of the invention is shown in FIGS. 9–12A wherein the parts similar in structure or function to those of the embodiment 100 are designated by similar reference numerals followed by "a." The difference only will be discussed hereunder. Pipes 154*a*, 156*a*, 158*a*, 160*a* and 162*a* are formed integral with a housing member 112*a* and extend therefrom all in axial direction, rather than in radial direction as in the embodiment 100. Three reed valves 144*a*, 148*a* and 152*a* mounted on one end face of a center plate 120*a* are united into an integral structure 300, as shown in FIGS. 12A and 12B. As will be seen in FIG. 12B, the integral reed valve structure 300 is formed and constructed such that, when the structure is in its free or relaxed state (namely, when the structure is not fastened and secured to the center plate 120*a*), each of the reed valves 144*a*, 148*a* and 152*a* extends obliquely at an angle $\theta$ relative to the general plane define by the ring-like outer periphery of the structure 300. Thus, when the reed valve structure 300 is forcibly pressed against the end face of the center plate 120*a* and secured thereto, the reed valves 144*a*–152*a* are forcibly pressed against the end face of the center plate 120*a* to improve the sealing engagement therebetween. The other reed valves 146*a* and 150*a* associated with the other end face of the center plate 120*a* are also united into an integral structure 300′. This reed valve structure 300′ has three reed valves, as shown in FIG. 11, although there are only two ports or openings to be closed and opened by this reed valve structure 300′. Namely, the reed valve structure 300′ can be identical in structure to the reed valve structure 300, which greatly reduces the cost of manufacture.

The means for adjusting the free lengths of the reed valves 144*a*, 148*a* and 152*a* is in the form of a spider 302 having three legs 164*a*, 168*a* and 172*a* extending radially outwardly from a circular central section, as best seen in FIG. 10. Each of these legs is bent, as shown in FIG. 9, and has a radially outer end which is in pressure engagement with the associated reed valve (148*a* in FIG. 9). The point of engagement of the radially outer end of the leg 168*a* is radially shifted by rotating an adjust screw 190*a* in either direction, so that the free length of the reed valve 148*a* is varied. The means for adjusting the free lengths of the reed valves 146*a* and 150*a* is of a generally circular structure 302′ having radially inwardly extending fingers 166*a* and 170*a* which are bent, as shown in FIG. 9, so that the radially inner ends thereof are in pressure engagement with the reed valves 146*a* and 150*a*, respectively. The points of engagement of these fingers 166*a* and 170*a* are radially shifted by rotating adjust screws 186*a* and 192*a*, respectively.

Figure 13:
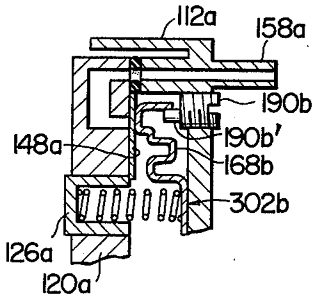
FIG. 13 is a fragmentary sectional view illustrating a further modified form of the means for adjusting free lengths of reed valves.

FIG. 13 illustrates a further modified form of the means for adjusting the free lengths of the free lengths of the reed valves. The further modification 302*b* includes a radially outwardly extending leg 168*b* having several bends and has a radially outer portion which is in pressure contact with an associated reed valve 148*a*. A modified adjust screw 190*b* has an eccentric pin 190*b*′ which extends axially inwardly from the inner end of the screw and is engaged with the axially extending outermost end portion of the leg 168*b*. It will be appreciated that the rotation of the adjust screw 190*b* in one direction results in a radial displacement of the point of engagement of the leg 168*b* with the reed valve 148*a* so that the free length thereof is varied.

Figure 14:
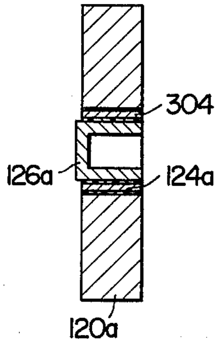
FIG. 14 illustrates in section a bearing sleeve disposed between a center plate and a cup-shaped member to improve the axial sliding movement thereof relative to the center plate.

Referring to FIG. 14, a bearing sleeve 304 may advantageously be interposed between the center plate 120*a* and the cup-shaped member 126*a* to improve the axial sliding movement of the member 126*a* relative to the inner peripheral surface of the center bore 124*a* in the center plate 120*a*. The bearing sleeve 304 comprises a sleeve of a metal having inner and outer surfaces coated with layers of Teflon (trade name).

Figure 15:
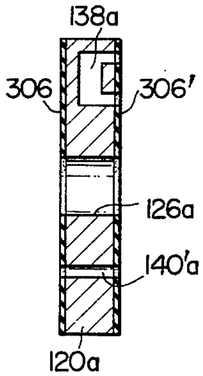
FIG. 15 illustrates in section layers of elastomeric material applied to opposite end faces of the center plate to improve air-tightness of sealing engagement between the end faces and associated reed valves.

Referring to FIG. 15, the end faces of the center plate 120*a*, which are adapted to be engaged by the reed valves, may preferably be coated with layers 306 and 306′ of an elastomeric material, such as fluorine-contained rubber, to improve the air-tightness of the sealing engagement between the reed valves and the center plate 120*a*.

What is claimed is:

1. An atmospheric pressure compensation device for use with a carburetor, comprising:
   - a housing having an air inlet and at least one air outlet;
   - a filter element covering said air inlet;
   - means in said housing defining a planar surface in which at least one opening is formed, said opening leading to said air outlet, the portion of said surface around said opening providing a substantially flat valve seat;
   - a flat valve member formed of resilient sheet metal having an end portion fixed to said surface in spaced relation to said opening, said valve member having a free portion having a substantially flat valve surface urged by the resiliency of said sheet metal to be brought into sealing engagement with said valve seat; and a bellow means having rod means extending through another opening in said surface and operatively engaged with said free portion of said valve member and being responsive to variation in the atmospheric pressure to vary the angular position of said free portion of said valve member relative to said valve seat, said valve seat being positioned between said fixed end portion of said valve member and the engagement therewith of said rod means.

* * * * *